United States Patent
Janis et al.

(10) Patent No.: US 9,589,249 B1
(45) Date of Patent: Mar. 7, 2017

(54) ACCESS AUTHENTICATION AND/OR ITEM PROCESS MANAGEMENT USING IDENTIFICATION CODES

(71) Applicant: The Laundry Chute LLC, Palm Beach Gardens, FL (US)

(72) Inventors: James Andrew Janis, Pittsburgh, PA (US); David Dwane Conklin, Washington, PA (US); Robert Alan Young, Palm Beach Gardens, FL (US)

(73) Assignee: The Laundry Chute LLC, Palm Beach Gardens, FL (US)

(*) Notice: Subject to any disclaimer, the term of this patent is extended or adjusted under 35 U.S.C. 154(b) by 0 days.

(21) Appl. No.: 14/597,813

(22) Filed: Jan. 15, 2015

Related U.S. Application Data

(60) Provisional application No. 61/928,666, filed on Jan. 17, 2014.

(51) Int. Cl.
*G06F 17/00* (2006.01)
*G06Q 10/08* (2012.01)

(52) U.S. Cl.
CPC ............................ *G06Q 10/087* (2013.01)

(58) Field of Classification Search
USPC ................... 235/375, 380; 340/10.1–10.6
See application file for complete search history.

(56) References Cited

U.S. PATENT DOCUMENTS

| | | | |
|---|---|---|---|
| 2005/0035860 A1* | 2/2005 | Taylor | G06K 7/0008 340/572.1 |
| 2007/0215685 A1 | 9/2007 | Self et al. | |
| 2010/0250384 A1 | 9/2010 | Bhargava | |
| 2012/0187185 A1 | 7/2012 | Sayan | |
| 2012/0278096 A1 | 11/2012 | Holness | |
| 2012/0316950 A1 | 12/2012 | LaPorte et al. | |
| 2012/0319815 A1 | 12/2012 | Feldman | |
| 2013/0031623 A1 | 1/2013 | Sanders | |
| 2013/0054271 A1 | 2/2013 | Langford et al. | |
| 2013/0145446 A1 | 6/2013 | Dorso et al. | |

* cited by examiner

*Primary Examiner* — Jamara Franklin
(74) *Attorney, Agent, or Firm* — Cesari and McKenna, LLP

(57) ABSTRACT

Methods and systems using unique item identifiers and a wireless device to (a) authenticate authorization to take possession of an item and (b) specifying and/or tracking service processing of the item.

18 Claims, 7 Drawing Sheets

- CUSTOMER RECORD
  - NAME (FIRST AND LAST)
  - SCHOOL/ INSTITUTION ID
  - LOCATION ID
  - UNIQUE CUSTOMER ID
  - CONTACT PHONE NUMBER (TEXT NOTIFICATIONS)
  - WIRELESS DEVICE TYPE
  - UNIQUE DEVICE ID

- CUSTOMER PIN
  - LOGIN ID
  - PASSWORD
  - HOME ADDRESS (INCLUDING COUNTRY)
  - BILLING ADDRESS (INCLUDING COUNTRY)
  - PERSONAL EMAIL ADDRESS
  - MARKETING DATA

FIG. 6

- ORDER RECORD
    - CUSTOMER ID
    - ORDER NUMBER
    - DATE
    - QR CODE OF ASSOCIATED TAG
    - LIST OF PROCESSING INSTRUCTIONS (ONE RECORD PER GARMENT)
        - GARMENT ID (BASED ON STANDARD GARMENTS LIST)
        - STANDARD PROCESSING INSTRUCTION ID
        - SPECIAL PROCESSING OR DRY CLEANING INSTRUCTION INDICATOR
        - INSTRUCTION PROVIDED BY CUSTOMER
        - PICTURE(S) OF GARMENT
    - PICKED UP BY SERVICE SCAN INDICATOR
    - PROCESSING SCAN INDICATOR
    - PACKAGED SCAN INDICATOR
    - LOADED FOR DELIVERY SCAN INDICATOR
    - DELIVERED SCAN INDICATOR
    - PICKED UP BY CUSTOMER SCAN INDICATOR

FIG. 7

ACCESS AUTHENTICATION AND/OR ITEM PROCESS MANAGEMENT USING IDENTIFICATION CODES

CROSS REFERENCE TO RELATED APPLICATIONS

This patent application claims priority to a U.S. Provisional Patent Application Ser. No. 61/928,666 filed Jan. 17, 2014, the entire contents of which are hereby incorporated by reference.

BACKGROUND

Technical Field

This patent application relates to electronic systems for managing access to an item and for services to be applied to an item.

Background Information

Certain businesses provide a service where a physical object owned by someone else is taken in for handling or processing and then returned. One such business is a laundry service. Institutions such as restaurants, hotels and hospitals, delivery services, emergency responders, indeed any organization that dresses their public-facing personnel in uniforms, requires a constant flow of clean linens and garments. A similar challenge is presented in a university or hotel valet where there may be thousands of students or hotel guests needing their personal garments washed on a regular and timely basis.

Organized collection, sorting, laundering, packaging, and timely return of articles in these environments is critical to smooth operation of the institution as a whole.

It is also important to correctly associate a specific customer with each piece of personal property being serviced so that items are not returned to people who are not authorized to receive them.

A customer of such a service would also prefer to be notified of certain events, such as the stage of processing, and when their items are ready to be picked up.

SUMMARY

In one implementation, a physical item that is to be submitted for handling by a service provider is associated with a unique identifying code that is electronically readable, such as a Quick Response (QR) code. The electronic identifying code may be placed on the item itself, or placed on a container for the item. For example, in the case where the service is a laundry service, the identifying code is preferably placed on the outside of a laundry bag issued to an individual end customer.

In one example implementation, a customer having item(s) for service is expected to have a smartphone or other personal portable computing device that is capable of (a) executing a mobile application software program to interact with the customer;

(b) being electrically queried to retrieve a Universal Device Identifier (UDID) associated with the smartphone;

(c) taking a digital photo of the identifying code associated with the item (laundry bag); and/or (d) taking digital photos of the service item(s) themselves (such as a garment) to further support any special instructions to be used in rendering the service.

Prior to a customer dropping off their items for service, the smartphone application is executed to initiate collection of information needed to initiate a service order. Using the smartphone application, the customer may take pictures of any items needing special processing. For example, a picture may be taken of an article of clothing that is stained, and that picture is stored with the special order instructions.

It is also possible to provide authentication before a customer is permitted to take possession of a processed article. For example, once the articles are processed (laundered) by the service provider, they may be returned to a pick up location. At this point, the customer arrives to pick up their items and runs a smartphone application. After physically identifying their items (for example, their laundry bag), the smartphone is used to scan/electronically detect the unique item identification code (the QR code on the bag) and to upload the item ID and the smartphone UDID to a server. The service checks the item ID and UDID data pair against its stored information to verify the identity of the customer. At this point additional authentication information such as an access code may be required to be provided via the smartphone application. It is only after the verification and authentication of the customer is the customer permitted to take the item away from the pick up location.

The use of QR codes on or associated with the item itself also provides a way to track the progress items. For example, when items are dropped off for service, the identifying code for the item may be scanned to initiate automated tracking. From there, each state a laundering process can be recorded, from laundry pickup through travel to a processing plant, through all laundering stages, to packaging, to return delivery at the point where it is claimed by the customer. This allows for both the operator and customer to have real-time insight into the status of laundry orders at any point of the processing cycle.

Other features and advantages will become evident after reviewing the detailed description that follows.

BRIEF DESCRIPTION OF THE DRAWINGS

The description below refers to the accompanying drawings, of which:

FIG. 6 is an example data structure for a customer record; and

FIG. 7 is an example data structure for an order record.

DESCRIPTION OF AN EXAMPLE EMBODIMENT

As will be understood after reviewing the detailed description below, a system and method can be provided that uses electronically readable identifying information placed on an item, such as a Quick Response (QR) code, in connection with a unique identifier for a personal portable computing device, such as a unique device identifier (UDID) for a smartpont. The QR code and UDID are used for the purpose of identifying and authenticating the owner or other authorized person to access the physical item at the time it is claimed, as well as to track the status of submitting that same item through a service process.

A particular implementation for tracking a laundry bag item is discussed below. This implementation illustrates the use of the system and method from both the perspective of a customer of a laundry service as well as the perspective of a laundry service provider, and describes a sequence of operations performed by associated smartphones, servers, and databases. It will be understood however that other types of services that take in articles to be processed can make use of the techniques described herein.

Figure 1:
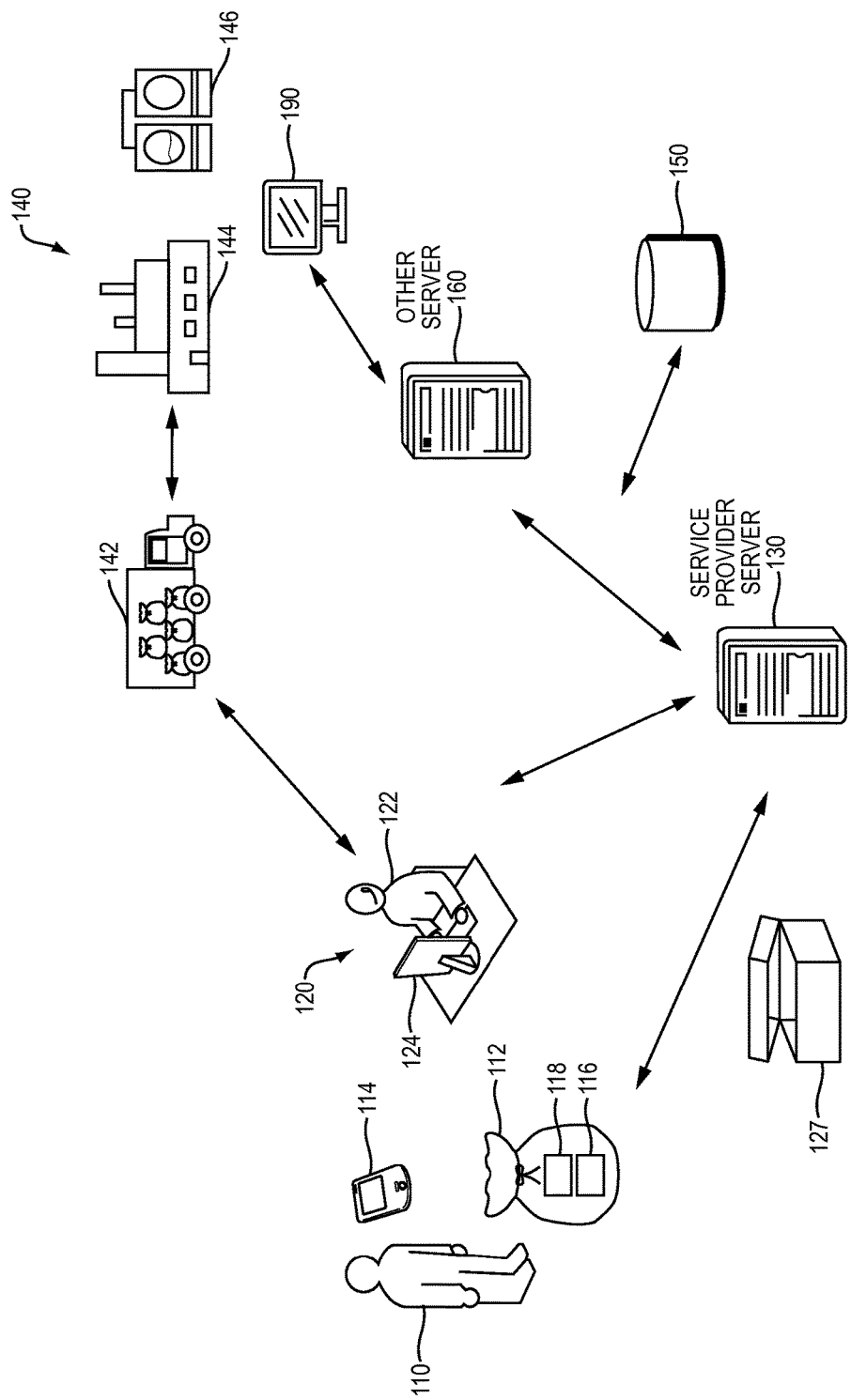
FIG. 1 is a high level graphic depiction of a laundry service from the perspective of an end customer.

FIG. 1 generally illustrates a smartphone driven laundry service from the perspective of a customer. Here a customer 110 (who, for example, may be a college student or other institutional customer) brings their dirty laundry 112 and smart phone 114 to a drop-off location 120. The customer may have been assigned a scheduled date and time to drop off their laundry at location 120. The customer 110 has previously signed up to use a laundry service 140 either by using their smartphone 114 or via some other wireless computing device. The sign up process can be through any known electronic commerce process. The customer 110 may for example have previously interacted using their smart phone 114 with a server (called a service provider server 130 herein) to provide certain personal information such as their name and contact info, and billing information such as a payment, which is then stored in database 150.

During the sign-up process, the personal information for customer 110 is identified and associated in the database 150 with a customer record that may include (i) an identifier their smart phone 114 such as by storing a unique device identifier (UDID) for the customers' smartphone 114 as well as ii) an identifier for a laundry bag 112. An identifier tag 116 is associated with the laundry bag 112. The tag 116 conveniently takes the form of a QR code, barcode, or other visual indicia which can be digitally scanned or otherwise electronically detected by the smartphone 114. The indicia associated with the tag 116 may be printed or located on or within the bag itself, or may be printed or located on a fob attached to the bag. The tag 116 may thus either be permanently or temporarily associated with the bag, depending on the needs of the customer 110 and/or the laundry service provider.

In one example implementation, a clerk 122 is located at the drop-off location 120 and assures orderly collection (and later delivery) of laundry bags from and to multiple customers 110. The clerk 122, via mobile device and software application running on a computer, tablet, or smartphone 124, scans or electronically detects the unique QR code on the tag 116 of the laundry bag 112 for the customer 110 that is bringing their laundry for processing. This detection of the QR code is forwarded and stored in database 150 and can represent liability transfer of the laundry items from the customer 110 to the laundry service 140. From the perspective of the customer 110, all they typically need to interact with is the clerk 122 at the pick-up location and their smartphone 114.

In other embodiments, the drop-off location 120 may be an electronically controlled lock box 127 that is not attended by a clerk 122. In that arrangement, the customer 110 may gain access to the lock box 127 at any time (or only at scheduled times) by arriving at the drop off location 120. The customer 110 then calls up the smartphone application to exchange information wirelessly and electronically to identify themselves and to cause the lock box 127 to unlock. The unlocking may occur, for example, electronically via commands sent by server 130 to the lock box 127, or by an unlock code to the customer via the smartphone application which is then used to manually manipulate a lock on the box 127.

The customer 110 themselves can then scan the tag 116 and deposit the bag 112 in the lock box 127. This event can be detected and reported to the server 130. An access code or password may also be associated with the lock box 127 and scanned or typed into the smartphone application 114 by customer 110 to access the lock box 127 and/or inform server 130 that a bag has been dropped into the lock box 127. In any event, the server 130 can now record the fact that the lock box location 127 has a new bag 112 now needing laundry services.

A number of other systems and entities exist behind the scenes that the end customers 110 do not typically see.

For example, at a subsequent time a laundry service provider 140 sends a vehicle 142 to the drop off location 120 to retrieve multiple laundry bags 112. The vehicle 142 transports the bags to a laundry processing plant 144 containing laundry machines 146. It is understood that the QR tags 116 on the bags 112 may at various times be further scanned. For example, the clerk 122 or driver of the vehicle 142 may scan them as they are loaded onto the vehicle 142 at the drop off location 120, or they may be scanned as part of intake processing at the plant 144, when items are processed by the laundry machines 146 or at other instances and places. The additional scanning information enables the service provider server 130 or other data processing machine such as one or more other machine(s) 160 to keep track of the status of each laundry bag 112. In different implementations, other data processing machines (s) 160 may access the database 150 through the service provider server 130 or may have direct access to database 150. For example, a laundry service operator version of the software application located at plant 144 may be used by service personnel to review order status and order details, such as to carry out any special processing instructions.

At some point the laundry is processed 146, and the clean items are shrink wrapped with the bag 112 on top so that the QR code 116 is visible. The vehicle 142 then returns to the drop off location with the processed bags 112.

At this subsequent time, which may be a prearranged time or in response to receiving a message that the laundry is ready, the customer returns to location 120 (or some other designated location). At this time the customer 110 (with or without help from clerk 122) identifies their laundry bag 112 from among many other laundry bags that may have been dropped off. This identification by the customer may be recognizing a human-readable label 118 on the bag 112 such as a name tag. Having the QR code and other identification on a single ID tag is advantageous, so that it becomes more difficult to have bags switched/lost/etc. The customer 110 then again scans the QR code 116 on the identified bag 112 with their smart phone 114. The smartphone 114 and service provider server 130 then exchange information (UDID, QR Code, and Access Code) to confirm that the customer 110 is indeed authenticated as the owner of the bag 112 and provides a visual and/or audible indication to that effect. Upon recognizing the confirmation, the clerk 122 can now confirm that it is approved for the particular individual appearing before them in person to claim possession of the bag 112. The claimed status of the laundry order is now stored in the database 150 to represent liability transfer from laundry service 140 to customer 110.

Figure 2:
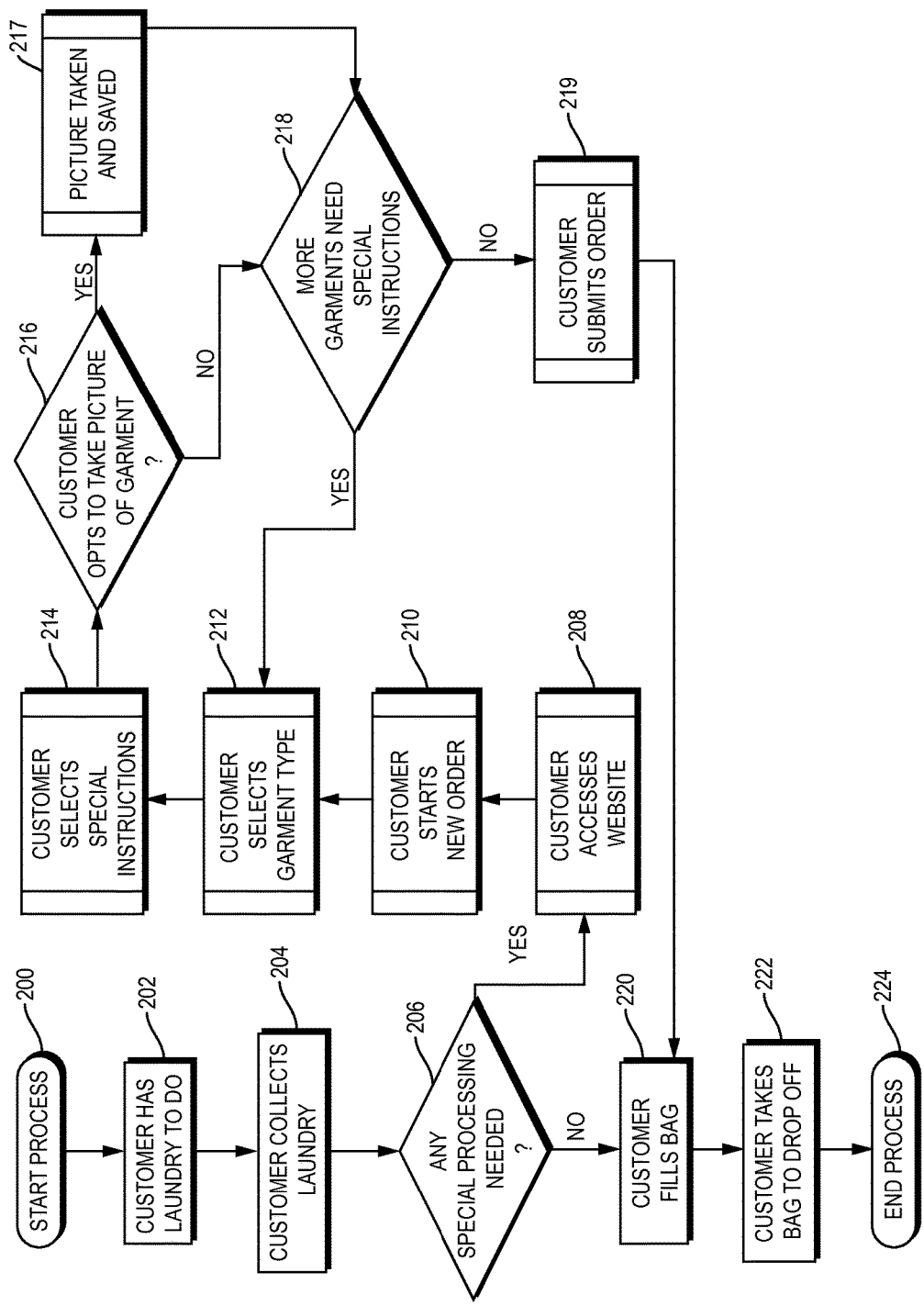
FIG. 2 is a work flow for initiating a new laundry service order.

FIG. 2 is a more detailed view of an example work flow performed when a customer 110 is beginning a new laundry order. From an initial state 200 the customer 110 realizes that they have laundry to be processed in state 202. In state 204 the customer collects their laundry. In state 206 if no special processing instructions are needed for the items collected, then the customer can proceed to state 220.

However if any of the items require special processing then a state 208 is entered. Here the customer accesses a website operated by the service provider server 130. This access may typically occur on the smartphone 114 using a mobile application. In state 210 the customer starts a new order in the context of the mobile application and may in state 212 select a type of garment to be processed. In state 214 the customer may indicate the special instructions for the garment. The special instructions may include for example indicating the garment is to be dry cleaned, spot treated, ony light starched, etc. Certain special instructions may activate additional charges processing in the mobile application, but other special instructions may not activate special charges.

In state 216 certain special instructions may request the customer 110 to take a photograph of the garment. For example, if a stain on the garment is to be spot treated the customer 110 may be asked to take a picture of the location surrounding the stain on the garment. In state 217 the picture is taken using the smartphone and saved as part of the order instructions being collected by the application running on the smartphone 114. In this step, the photograph may be itself annotated, such as by electronically circling, marking, or otherwise indicating the stained area on the picture of the garment needing attention.

Processing returns in either event to state 218, where if more garments need special instructions then state 212 is entered again. However, if no more garments need special instructions, then processing proceeds through state 219. The order with special instructions can be submitted at this time, or maintained by the smartphone 114 until a later time, such as when the customer arrives at the pickup location 120. In this step, the order details including any special instructions and/or photographs of articles are sent to an electronic order processing system such as via service provider server 130 and/or another server 160, and billing can occur at this point as well. Note that the special instructions and taking of photographs, etc., is conveniently done back in the dormitory or at home, before the appointment time. Thus at the appointment time, all the customer needs to do is to drop off the bag 112 and optionally confirm drop off with their smartphone 114.

In state 220 the customer can then fill the bag with the laundry items and in state 220 proceed to the drop off point 120. If the customer had no special processing instructions, then a standard order is initiated. Order initiation may typically by the customer interacting with their smartphone application, which can happen anytime prior to the bag 112 being left at the pick up location 120. Optionally, even if the customer does not initiate an order via their smartphone 114, a standard order might also be initiated at the time the bag 112 is scanned when it is loaded onto vehicle 142 or arrives at plant 144.

Figure 3:
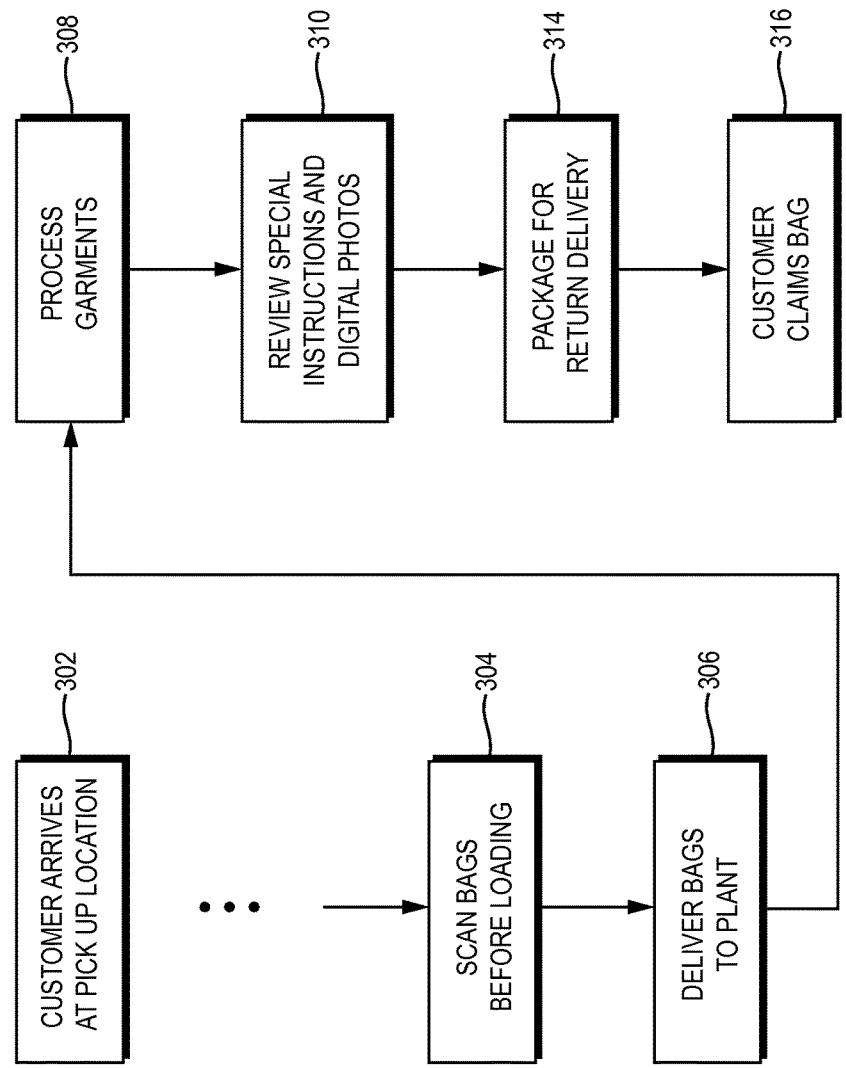
FIG. 3 is a work flow from the perspective of the laundry service provider.

FIG. 3 is a sequence of workflow events that may occur from the perspective of the laundry service provider 140. In a first state 302 a customer 110 arrives at the drop-off location 120 at an appointed time and leaves a laundry bag 112. At some later point in time in state 304 a driver arrives at the drop-off location. Here the driver will scan the laundry bags 112 before or while loading them on the vehicle. In state 306 the bags are then delivered to the plant 144.

In state 308 the garments are processed at the plant. In state 310 any details for any special items are identified, such as by laundry service personnel accessing database 150 via the order information via other server(s) 160. If any items require special processing then laundry service personnel can access digital photographs associated with the order such as via computer, tablet, smartphone, or other device 190 located in the processing plant 144. The photographs can be retrieved to ensure that special instructions are properly carried out as previously indicated for each specially handled garment by the end customer 110 who directly did so. Finally in a state 314 the laundry order is packaged with the bag 112 for return delivery to the drop off location 120.

Figure 4:
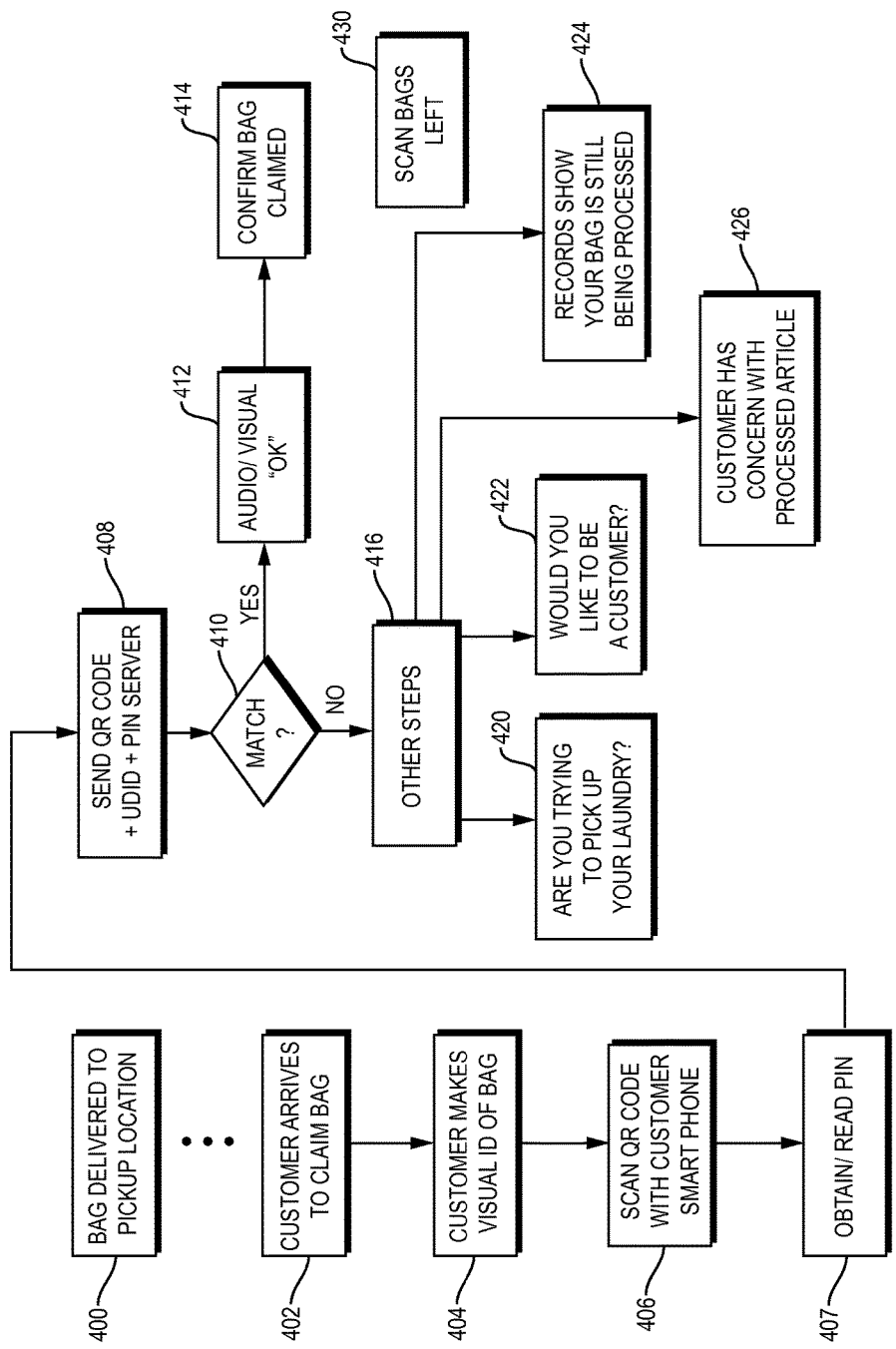
FIG. 4 is a work flow for a returning customer picking up their laundry.

FIG. 4 is a sequence of events that occur when the laundry is returned to the drop off location 120 in a state 400. At some later time in state 402 the customer arrives such as at an appointment time to pick up their bag 112. In state 404 customer 110 identifies their laundry bag 112 such as by visually noting their name tag 118 on the side of a bag from among a number of bags that may be present.

Once the customer 110 finds their bag 112 they then initiate an authentication process, such as by scanning the QR code 116 on the bag 112 with the application running on a smartphone 114. The QR code and the UDID electronically stored by the smartphone are then sent to the service provider server 130. The service provider server 130 then proceeds to a state 408 where an authentication process using the QR code and UDID is performed. It is possible at this point, before state 408 that additional authentication such as a passcode (such as four digit Personal Identification Number (PIN)) may be requested in state 407. This passcode may be entered by the customer 110 via the smartphone 114 and passed to the server 130 with the QR code and UDID in state 408.

In a state 410 it is determined if there is a match between the QR code scan and the UDID (and the passcode/PIN, if included) with the stored prior records for the order in process for that particular bag 112. If there is a match, then a positive visual and/or aural indication can be presented in state 412 on the smarphone 114 and shown to the clerk 122. The indication is taken by the clerk that the system has confirmed that it is OK for the person who has scanned the bag to take possession of the bag. In state 414 the confirmation notation that the bag has been picked up may be entered in the database maintained by the service provider server 130 for the purpose of tracking the state of the order.

If however back in state 410 there was no match between the QR code and UDID, or a failure of the passcode/PIN, indicating that the bag should not be taken, then a number of following states 416 can entered. For a state 420 may be entered where a question is asked via the smartphone to confirm if the user is trying to pick up a laundry bag. This can provide the customer a "way out" of a deviation in the normal expected pickup process flow; if they scanned an incorrect bag, an option can be presented for them to try again. Alternatively an optional state 422 can be entered in which the service can assume that the person scanning the bag is not yet a customer of the service, and an advertisement for the service can be presented on the smartphone. Also, an optional state 424 can be entered in which a display can be presented on the smart phone telling the customer that their bag has been delayed in processing. Also, in state 426, a screen may be optionally displayed allowing the user to indicate that some apparent mistake was made with the laundry processing (for example a garment was damaged) that will need further attention. However, this may also occur after the customer leaves the pick-up location, such as when the customer returns home and opens up the bag to inspect the processed laundry items.

Still other states 430 may be entered by the system to process any leftover bags that are not picked up at the appointment time. These may be noted by the clerk 122 scanning the leftover bags with the other computer 124 which may be a tablet. This information can then be entered into the service provider server 130 to keep track of the fact that the processed laundry bags were not picked up as expected at the appointment time.

Figure 5:
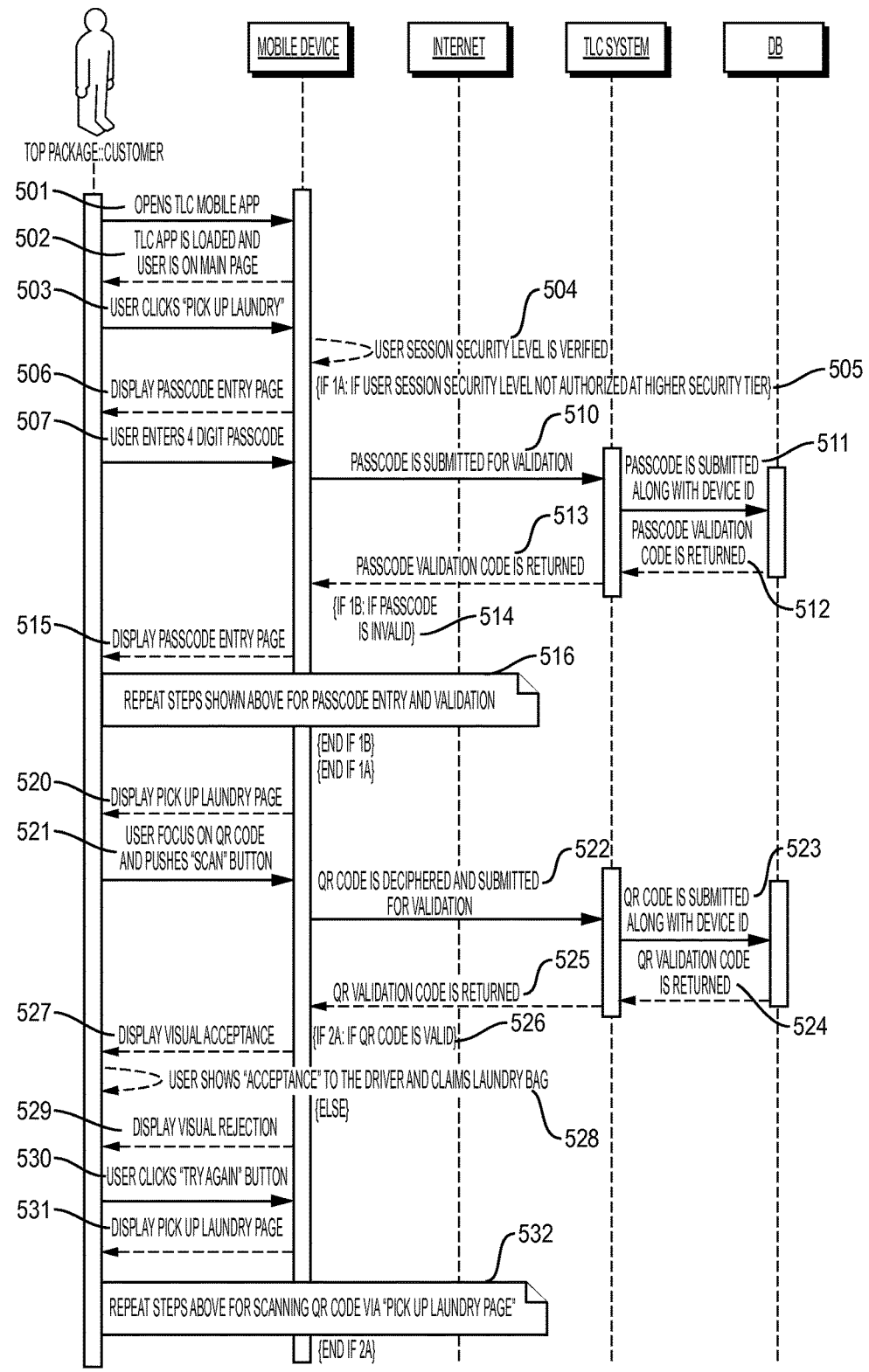
FIG. 5 is a sequence diagram for an authentication process.

FIG. 5 is a sequence diagram for messages exchanged between and/or actions performed by the customer 110, the customer's smartphone 114, the service provider server 130, and the database 150. This sequence diagram indicates the authentication process flow using a passcode (which controls access to higher level secured functions such as "Laundry Pickup" via an application tiered security implementation model) coupled with the QR Code and the UDID to authenticate and authorize the customer 110 to take possession of laundry bag 112.

In a first state 501 the customer 110 opens the application on their smartphone 114, and in state 502 the smartphone loads the smart phone application. In state 503 the user enters an input within the context of the application such as by clicking on a request to pick up their laundry. A test is then performed to determine if the user session is authenticated in step 504; if the session is already authenticated in state 505 then in state 520 the laundry pickup page is displayed; otherwise, if the session is not already authenticated in state 505 then a passcode entry page is displayed on the mobile device in state 506. The customer then enters a passcode in state 507 which is then passed for validation in state 510 along with the UDID for the mobile phone in state 511. If the validation code returned in state 512 and 513 is invalid in state 514, then a passcode entry page can be displayed in state 515. These steps can be repeated in state 516 if further necessary to validate passcode entry.

In state 520 a point is reached where a pick up laundry page is displayed on the smartphone device 114. The customer then uses the smartphone 114 to focus on and scan a QR code of the bag 112 in state 521. Here the smartphone may capture the QR code such as via a digital photograph. The application next, in state 522, deciphers the QR code from the photograph and forwards it to the server 130. At state 523 the QR code (and optionally UDID) are sent through a network connection such as the Internet to the database 523. The database 523 maintains a mapping of these values as authentication factors and then returns a QR validation code in state 524. This QR validation code is then returned to the smartphone in state 525. If the QR code is valid in state 526 then a visual indication of acceptance of the customers request to pick up the bag is displayed in state 527 on the smartphone 114.

At this point in state 528 the customer 110 shows the visual indication of acceptance to the clerk 122 for confirmation and then the customer may claim the laundry bag and accept it; alternatively visual indication of rejection of the customers request to pick up the bag is displayed to the customer 110 in state 529. If the acceptance is rejected, then a sequence of states 530 and 531 and 532 may be repeated to try to successfully complete the pick up process again.

FIG. 6 is an example data structure for the information in a customer record maintained in the database 150.

FIG. 7 is an example data structure for the information in an order record in the database 150.

Implementation Options

It will be understood that the data processing elements such as the wireless devices, smartphones, servers, file systems, and databases described herein may further include infrastructure elements that are not shown, such as other types of physical networking equipment such as routers, switches, and firewalls, or other data processing equipment such as servers, load balancers, storage subsystems, and the like. The servers may include web servers, database servers, application servers, storage servers, security appliances or other type of machines. Each server typically includes an operating system, application software, and other data processing services, features, functions, software, and other aspects.

It should be understood that the example embodiments described above may be implemented in many different ways. In some instances, the various smartphones and servers include "data processors" that may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein are a computer program product that provides at least a portion of the software instructions for the system. Such a computer program product can be installed by any suitable software installation procedure, as is well known in the art. In another embodiment, at least a portion of the software instructions may also be downloaded over a cable, communication and/or wireless connection. Embodiments may thus also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

It should therefore be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

While this invention has been particularly shown and described with references to example embodiments thereof, it will be understood by those skilled in the art that various changes in form and details may be made therein without departing from the scope of the invention encompassed by the appended claims.

What is claimed is:

1. A method for using a wireless device to authenticate authorization for an individual to take possession of an item, comprising:
   electronically scanning the item with the wireless device to detect an identification code;
   receiving information concerning a personal identification number for the individual;
   sending the identification code, the personal identification number, and a unique identifier for the wireless device to a server;
   receiving a verification from the server that the identification code, the personal identification number, and the unique identifier for the wireless device match a record for the item; and
   providing a visual or audible indication of the match on the wireless device, to indicate authorization to take possession of the item.

2. The method of claim 1 wherein the item is a laundry bag.

3. The method of claim 1 wherein the item further includes a human-readable label, and the item is first identified using the human-readable label before the step of electronically scanning.

4. The method of claim 1 wherein the identification code depends on both an identity of a person authorized to take possession of the item and a unique identifier for the item.

5. The method of claim 1 wherein the unique identifier for the item is printed on the item.

6. The method of claim 1 wherein the unique identifier for the item is on a tag attached to the item.

7. The method of claim 1 wherein the unique identifier for the item is a QR code, bar code, or other electronically scannable indicia.

8. A method for tracking an item through a process implemented by a service provider for a customer comprising:
   electronically scanning the item to detect an item unique identifier;
   processing the item;
   before returning the item to the customer;
     reading, from a wireless device associated with the customer, a device unique identifier for the wireless device associated with the customer and an item unique identifier that was obtained by prior scanning of the item with the same wireless device; and
     comparing the device unique identifier and the item unique identifier to predetermined identifiers.

9. The method of claim 8 wherein the item is a laundry bag containing one or more articles of clothing, the method additionally comprising:
   before the step of electronically scanning,
     receiving special processing instructions for the article of clothing via the customer interacting with the wireless device.

10. The method of claim 9 wherein receiving special processing instructions further comprises:
    using the wireless device to take a picture of at least one article of clothing.

11. The method of claim 10 further comprising:
    using the wireless device to electronically mark the picture of the article of clothing to further indicate the special processing instructions.

12. A method for using a wireless device to track an item through a process implemented by a service provider for a customer comprising:
    electronically scanning the item with the wireless device to detect an identification code for the item;
    using the wireless device, sending the identification code and a unique identifier for the wireless device to a server;
    receiving a verification from the server;
    providing a visual or audible indication of the verification on the wireless device;
    after processing the item;
    reading, from a wireless device associated with the customer, a device unique identifier for the wireless device associated with the customer and an item unique identifier; and
    comparing the device unique identifier and the item unique identifier to predetermined identifiers.

13. The method of claim 12 wherein the item is a laundry bag.

14. The method of claim 12 wherein the item further includes a human-readable label, and the item is first identified using the human-readable label before the step of electronically scanning.

15. The method of claim 12 wherein the identification code depends on both an identity of a person authorized to take possession of the item and a unique identifier for the item.

16. The method of claim 12 wherein the unique identifier for the item is printed on the item.

17. The method of claim 12 wherein the unique identifier for the item is on a fob attached to the item.

18. The method of claim 12 wherein the unique identifier for the item is a QR code, bar code, or other electronically scannable indicia.

* * * * *